United States Patent [11] 3,628,816

| [72] | Inventor | Peter M. Ross, Jr.<br>Livonia, Mich. |
| --- | --- | --- |
| [21] | Appl. No. | 7,493 |
| [22] | Filed | Feb. 2, 1970 |
| [45] | Patented | Dec. 21, 1971 |
| [73] | Assignee | Ford Motor Company<br>Dearborn, Mich. |

[54] SLEEVE NUT CONNECTOR
8 Claims, 5 Drawing Figs.

[52] U.S. Cl............................................. 287/23,
 85/72, 85/80
[51] Int. Cl............................................. F16b 9/02
[50] Field of Search............................. 287/20, 23,
 189.36 R, 189.36 F, 20.5, 126, 119; 85/72, 80

[56] References Cited
UNITED STATES PATENTS

| 2,941,439 | 6/1960 | Rapata | 85/72 |
| 3,033,624 | 5/1962 | Biesecker | 287/20 UX |
| 3,425,313 | 2/1969 | Villo | 85/53 |

Primary Examiner—David J. Williamowsky
Assistant Examiner—Wayne L. Shedd
Attorneys—John R. Faulkner and Roger E. Erickson ABSTRACT: A connecting means adapted to retain a rodlike element within an aperture of a lever or the like. The connecting means has a rodlike element receiving bore, passage through which is blocked by an obstruction. A force applied to the rodlike element sufficient to cause the latter to displace or shear the obstruction is also sufficient to assure that the rodlike element will be completely received within the bore of the connecting means and that a secure connection has been effected.

PATENTED DEC 21 1971
3,628,816
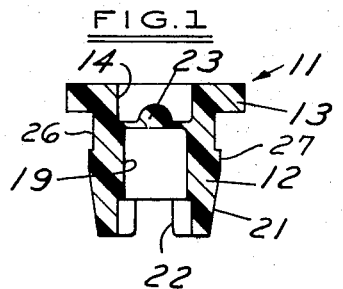
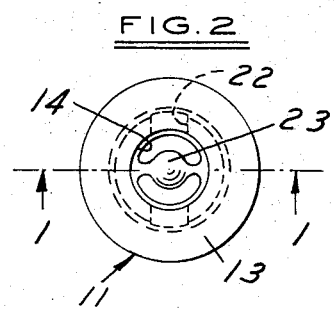
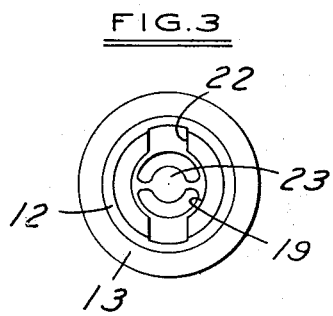
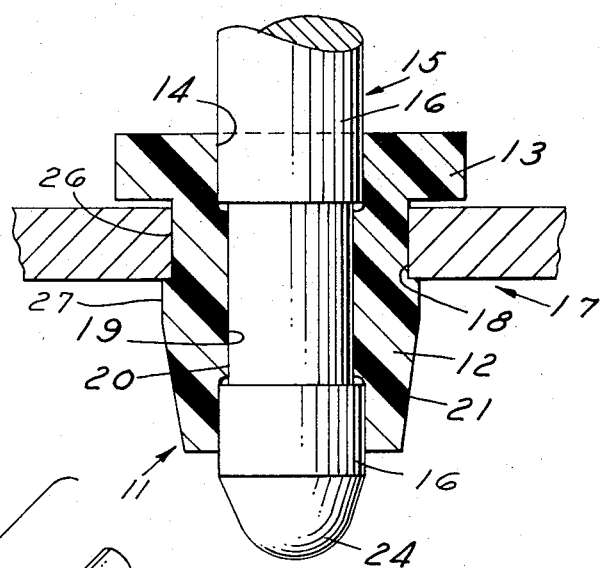
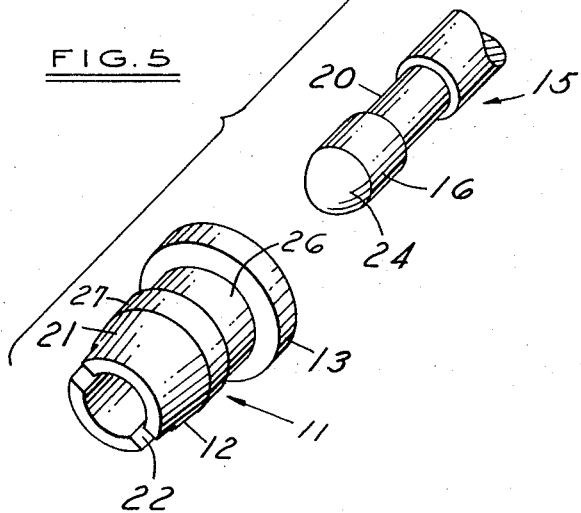
INVENTOR.
PETER M. ROSS, JR.
BY John R Faulkner
Peter E Erickson
ATTORNEYS

SLEEVE NUT CONNECTOR

BACKGROUND AND SUMMARY OF THE INVENTION

In mass production assembly operations requiring the connection of a first workpiece having a rodlike element to a second workpiece having a aperture formed therein, it is common practice to employ a plastic sleeve nut connector which is positioned within the aperture and into which the rodlike element is inserted. Such a connector is disclosed in U.S. Pat. No. 3,164,054 granted to Biesecker on Jan. 5, 1965. The rodlike element commonly has a reduced diameter portion which, when the assembly is complete, is encompassed by a corresponding reduced diameter portion of the bore of the sleeve nut connector. The sleeve nut connector is sufficiently elastically deformable to permit the rodlike element to be inserted and retained therein with an interference fit.

While such connectors are improvements over previously used metal spring clips, certain problems have arisen in assembly line applications. It has been found that it is possible for the assembler to fail to push the rodlike element into the bore of the sleeve nut connector sufficiently far to form a complete and fully secured connection. In prior art sleeve nut connector designs, unless the rodlike element is completely introduced into the sleeve nut bore so that the reduced diameter retaining portions engage, an unstable and impermanent connection is formed.

It is an object, therefore, of the present invention to provide a sleeve nut connector design which minimizes the possibility of partially inserted connections subject to later failure. This invention provides a sleeve nut connector design which obstructs passage of the rodlike element through the connector bore until a sufficient force is applied to complete the connection between the first and second workpieces. This invention further provides a sleeve nut connector having a frangible or perforable obstruction within its bore which must be sheared from the remainder of the sleeve nut connector before the rodlike element is permitted to appreciably enter the connector bore. It also provides a sleeve nut connector integrally formed of a single material which is economical to produce and reliable in operation.

BRIEF DESCRIPTION OF THE DRAWINGS

FIG. 1 is a cross-sectional view of the line 1—1 of FIG. 2 of a connecting means embodying the invention;

FIG. 2 is a top view of the connecting means;

FIG. 3 is a bottom view of the connecting means;

FIG. 4 is a front cross-sectional view of the connecting means showing a connection between a workpiece having a rodlike element and an apertured workpiece; and FIG. 5 is a perspective view of the connecting means and the shaft element in an unassembled condition.

DETAILED DESCRIPTION OF THE PREFERRED EMBODIMENT

A sleeve nut connector 11 embodying the present invention includes a shank portion 12, a head portion 13 which joins the shank portion at one end and a bore 14 extending axially through the shank portion and the head portion. Such a connector is used to fasten a first workpiece 15 having a rodlike element 16 to a second workpiece 17 having a circular aperture 18 formed therein, as shown in FIG. 4. The bore 14 has a reduced diameter portion 19 which corresponds to a reduced diameter portion 20 of rodlike element 16 to provide an interference connection between element 16 and connector 11. The shank portion 12 of the connector includes a generally cylindrical segment 26, a radially enlarged segment 27 and a conically tapered end segment 21. The radially enlarged segment is engageable with the side of the second workpiece 17 opposite the head portion 13 of the connector, as shown in FIG. 4, and functions to retain the connector within aperture 18. The end segment 21 tapers to a minimum diameter of less than the diameter of aperture 18. A diametrically disposed slot 22 may be formed in shank portion 12 at the end opposite the head portion which together with the taper permits the shaft portion to be more easily inserted into aperture 18.

To minimize the possibility that an incomplete connection will be formed in the assembly of the first and second workpieces 15 and 17, an obstruction or web 23 is provided which extends across the connector bore 14 adjacent the head portion 13 and initially prevents entry of the round end 24 of the rodlike element 16 into the reduced diameter portion 19 of the bore. As may be seen in the drawings, the obstruction or web 23 is spaced axially inwardly from the upper opening of bore 14. This spacing provides an axial depression in which to locate and position the rodlike element prior to its complete insertion into the bore. To achieve a full connection, the assembler must push the round end 24 of the shaft element against the web 23 with a force sufficient to shear or rupture the web and thereby open bore 14. A force sufficient to shear the web is also sufficient to assure complete entry of rodlike element 16 into bore 14 so that reduced diameter portions 19 and 20 are axially aligned. It has been found that the web ruptures abruptly and that the force being applied by the assembler at the instant of rupture is more than adequate to cause the rodlike element to be fully received within the connector bore. The connector and workpieces are shown in fully assembled relationship in FIG. 4.

This invention also includes an alternate construction in which, in effect, the sleeve nut connector 11 and the apertured workpiece 17 are combined. In such a construction the equivalent of bore 14 and obstruction or web 23 are formed integrally in the workpiece into which the rodlike element 16 is to be inserted and a fastener independent of the workpieces to be connected is not needed.

Modifications and alterations will occur to those skilled in the art which are included within the scope of this invention.

I claim:

1. Connecting means for connecting an independent rodlike element to a member having a bore formed therein, said member including a rupturable obstruction to said bore preventing acceptance of said rodlike element into said bore until a force sufficient to rupture said obstruction is applied thereto, said obstruction being positioned axially inwardly from the initial opening of said bore to provide a depression for locating and positioning the rodlike element relative to the bore prior to rupture of said obstruction, retaining means for retaining said rodlike element within said bore upon acceptance of said rodlike element into said bore to a predetermined depth.

2. In combination, a rodlike element, a member independent from said rodlike element having a bore in which the element is received, interengagable means on the wall of said bore and said rodlike element adapted when the latter is inserted to a predetermined depth in the bore to hold the rodlike element against withdrawal, and a displaceable obstruction with said bore, said obstruction being spaced axially inwardly from the initial opening of said bore to provide a depression for locating and positioning the rodlike element relative to the bore prior to displacement, said obstruction yieldably resisting displacement until sufficient force is exerted thereon through the rodlike element to ensure insertion of the latter into the bore to said predetermined depth.

3. A connecting device for connecting a first workpiece having a rodlike element with a second workpiece having an aperture formed therein, said device including:

a shank portion for extending through the workpiece aperture, a head portion joined to one end of said shank portion for overlying one side of the second workpiece, said shank portion including retaining means engageable with second workpiece adjacent said aperture for retaining said connecting device within said aperture, a bore formed in said head portion and said shank portion for receiving the rodlike element of the first workpiece, wherein the improvement comprises a rupturable obstruction to said bore obstructing full acceptance of the rodlike element of said first workpiece into said bore until a predetermined force is applied thereto and the obstruction is displaced, said obstruction being spaced axially inwardly from the opening of said bore in the head portion of the connecting device whereby a depression is provided to locate and position the rodlike element relative to said bore prior to displacement of said obstruction.

4. In a connecting device according to claim 3 wherein:

said shank portion, head portion and rupturable obstruction are integrally formed of a polymeric material.

5. In a connecting device according to claim 3 wherein:

the rupturable obstruction is received within and extends across said bore.

6. In combination, a first workpiece having a rodlike element, a second workpiece having an aperture formed therein, a connecting device for connecting said rodlike element within the aperture of said second workpiece, said connecting device including:

a shank portion for extending through the workpiece aperture, a head portion joined to one end of said shank portion for overlying one side of the second workpiece, said shank portion including retaining means engageable with said second workpiece for retaining said connecting device within said aperture, a bore formed in said head portion and said shank portion for receiving the rodlike element of the first workpiece, a rupturable obstruction to said bore obstructing full acceptance of the rodlike element of said first workpiece into said bore until a predetermined force is applied thereto and the obstruction is removed, said obstruction being positioned axially inwardly from the initial opening of said bore in the head portion to provide a depression for locating and positioning the rodlike element relative to the bore prior to application of the predetermined force, interengagable means on the wall of said bore and the rodlike element adapted when the latter is inserted to a predetermined depth in the bore to resiliently and frictionally hold the rodlike element against withdrawal.

7. In a connecting device according to claim 3, said obstruction comprising a diametrically disposed web integrally formed with the remainder of said connecting device.

8. In a connecting device according to claim 6, said obstruction comprising a diametrically disposed web integrally formed with the remainder of said connecting device.

* * * * *